United States Patent [19]

Mathews

[11] 4,241,568
[45] Dec. 30, 1980

[54] FLAIL BLADE MOUNT FOR MOWERS

[76] Inventor: Bernard C. Mathews, 8606 Rte. 176, Crystal Lake, Ill. 60014

[21] Appl. No.: 54,835

[22] Filed: Jul. 5, 1979

[51] Int. Cl.³ .................................... A01D 55/22
[52] U.S. Cl. .............................. 56/294; 403/166
[58] Field of Search ............. 56/294, 12.7, 249; 248/221.3, 222.1; 403/166, 229

[56] References Cited

U.S. PATENT DOCUMENTS

| | | | |
|---|---|---|---|
| 3,025,866 | 3/1962 | Cockrum | 403/166 |
| 3,090,600 | 5/1963 | Smith | 403/166 |

FOREIGN PATENT DOCUMENTS

| | | | |
|---|---|---|---|
| 2370420 | 7/1978 | France | 56/294 |
| 11938 | of 1909 | United Kingdom | 403/229 |

*Primary Examiner*—Jay N. Eskovitz
*Attorney, Agent, or Firm*—Kenneth T. Snow

[57] ABSTRACT

A quickly detachable mounting link and its accompanying flail blades from sleeve lug mounts on a rotor drum. The link is U-shaped and has axially aligned oppositely disposed extensions at the upper end of the U. The depending portion of the U link is adapted to loosely carry the flail blades. One of the extensions is longer than the other and carries a coil spring therearound. The oppositely disposed extensions are adapted to slidably engage spaced apart, axially aligned sleeve lug mounts on the rotor drum. The coil spring in its normal extension keeps the mounting link in its sleeve mounts on the rotor drum. Quick detachment is accomplished by sliding the mounting link in a direction to compress the coil spring and effect removal of the short extension from its sleeve lug mount, whereupon the entire link may be removed from the rotor and the flail blades slid off the link over its short extension.

2 Claims, 5 Drawing Figures

U.S. Patent    Dec. 30, 1980    4,241,568
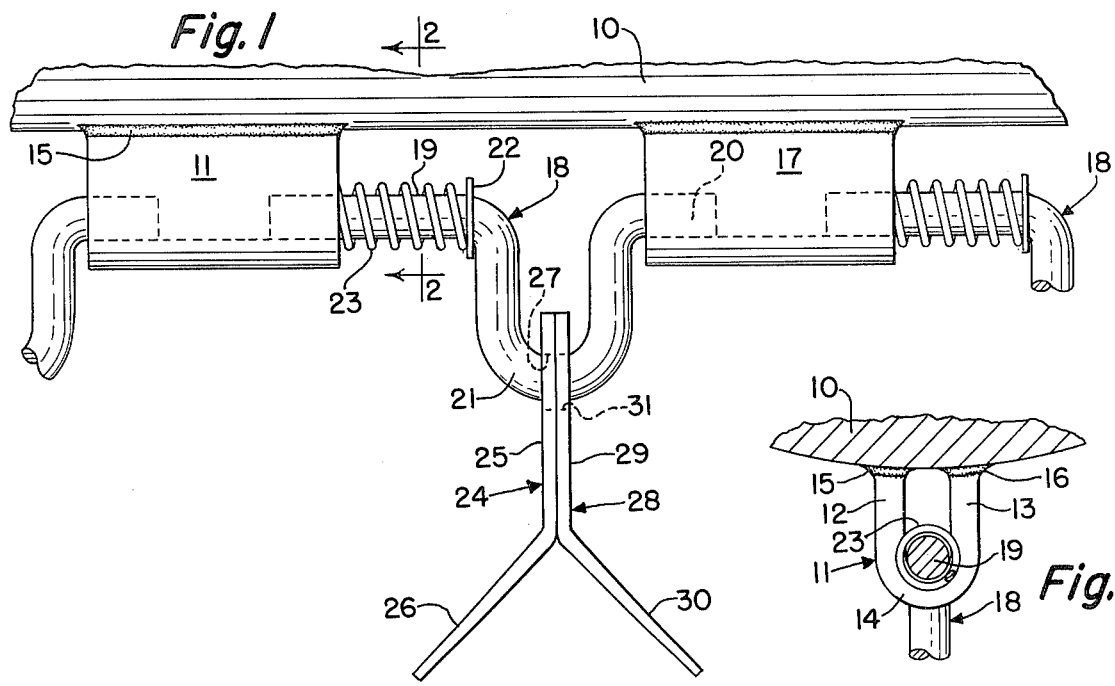
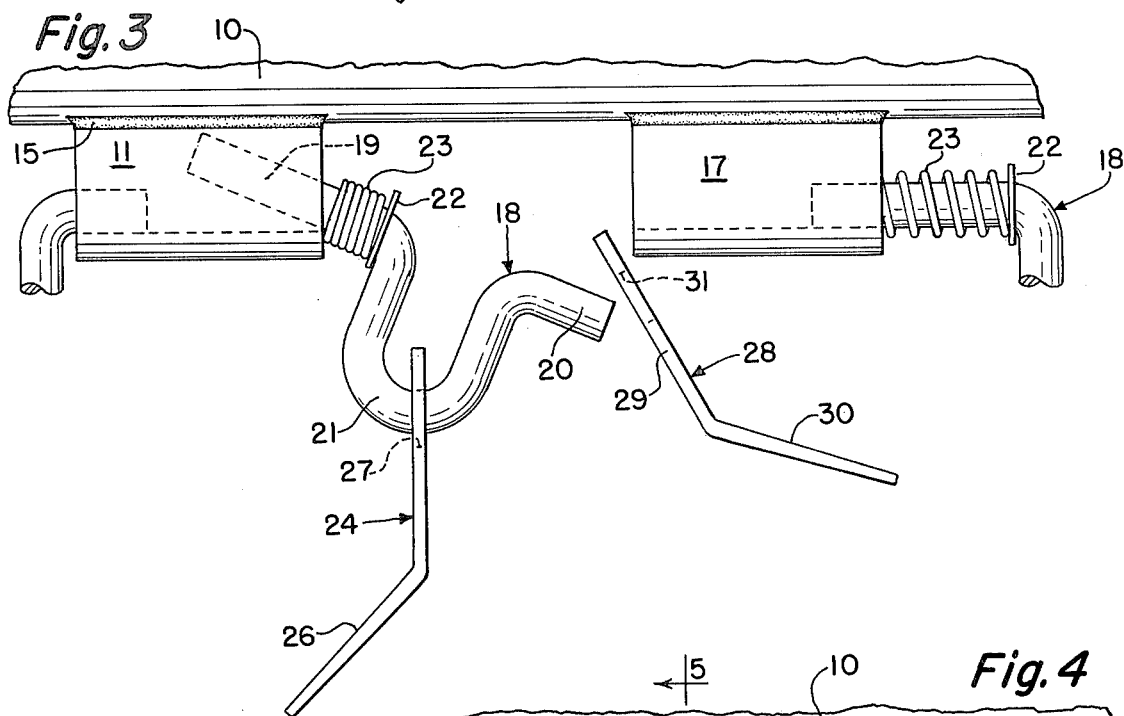
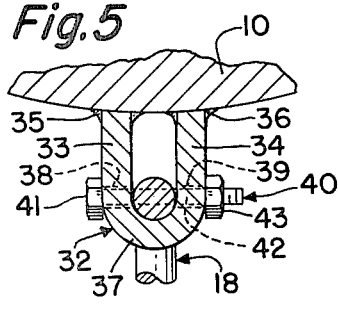
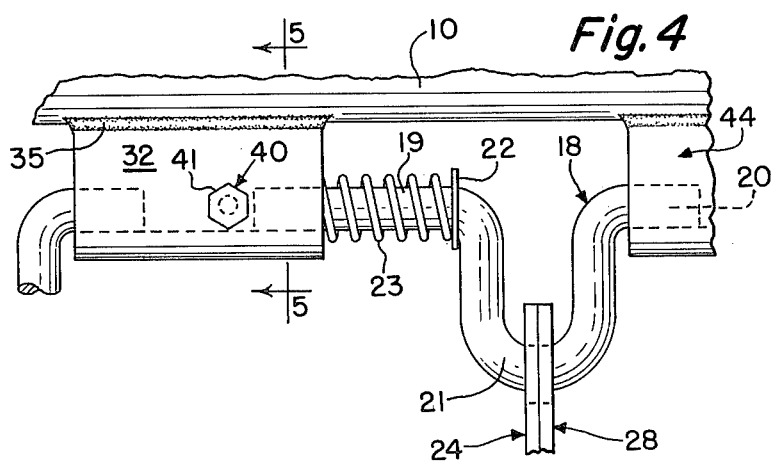

FLAIL BLADE MOUNT FOR MOWERS

BACKGROUND OF THE INVENTION

1. Field of the Invention

Flail type mowers because of their efficiency and their universal application to many types of mowing jobs are in great use. However, the free swinging blades of such flail mowers are subject to dulling from use and nicking from striking rocks and other foreign materials in the mowing operations. It is thus necessary to sharpen the blades periodically and in certain instances to replace the blades.

Many have previously worked on the development of means for removing the pendant blades for their required servicing. The present invention is directed to a quickly and easily dismountable blade for a flail type mower.

2. Description of the Prior Art

The present inventor has been a pioneer in the field of flail mowers and has had a number of prior issued patents on such mowers. The Mathews U.S. Pat. No. 3,693,335 defines a flail type mower which has the blades thereof removable by the removing of a nut threadedly engaging a horizontal shank formed with the blade.

The Mathews U.S. Pat. No. 3,831,357 shows and describes another method of blade removal from a flail type mower. Here, a blade supporting link is held in a sleeve lug on the mower rotor in such a manner that the compression of a spring will permit just enough movement of the mounting link to permit the unhooking of the blade therefrom.

The Mathews U.S. Pat. No. 3,831,359 relates to the permissive removal of a flail blade from a limited spacing of parts of a mounting link when that mounting is removed from a sleeve type lug. When the link engages the lug the space is closed, preventing blade removal.

The Mott U.S. Pat. No. 3,043,080 is directed to a blade mounting assembly for flail mowers. However, disassembly required extensive removal of elements to free the blades and hence blade servicing was very time consuming.

The Mott, Jr. U.S. Pat. Nos. 3,177,640 and 3,375,647 both show apparent advancements in blade dismounting for that time in history, but it was still a tedious job to service the blades.

The Woodring U.S. Pat. No. 3,400,527 describes the assembly and disassembly of a flail blade thusly: "The gap 44 particularly is narrower than the diameter of the bolt 20. After the knives are put onto the ring, the ring is put in place by hooking the hooks 38 over the bolt which may be done by fitting the end portions 42 to the space between the bolt and the shaft and then forcing the link into place by working, plying, spreading or prying it, etc., and if necessary it can be given a blow with a hammer to force it into place . . . . The ring is removed for replacement of the knives, by reverse movements." It is evident from this description that the blades are not easily removed for servicing.

The Panek and Woodring U.S. Pat. Nos. 3,402,541 and 3,411,279 both show flail mower blade mounts which are removable, but again removal does not appear to be simple.

All of the above described prior devices required substantial work and inconvenience to effect blade removal whereas applicant's subject blade mount is quickly and easily removable. Applicant's invention relates to the quick and easy removal of a flail blade and yet when the blades are functioning in the mower, the blades are securely locked in their operating position on the mower rotor.

SUMMARY OF THE INVENTION

A principal object of this invention is to provide a novel mounting assembly for a free swinging blade for a flail type mower.

An important object of this invention is to provide a novel means for carrying pendant blades on the drum of a flail type mower for quick and easy removal of those blades for service or replacement.

Another important object of this invention is to provide a novel blade support for flail mowers having a removable blade carrying mounting link normally spring biased for the retention of that link to a mower drum.

Another and further important object of this invention is to provide a device as set forth in the preceding object and including the novel holding of the mounting link in spaced apart axially aligned sleeve lugs.

Another and still further important object of this invention is to provide a device as set forth in the preceding two objects in which an axial sliding for the mounting link against the action of the spring permits separation of the mounting link from the mower rotor and thereafter a removing of the blades from the mounting link.

Still another and further important object of this invention is to provide a device as set forth in the preceding three objects in which a removable pin may be positioned in one of the sleeve lugs to prevent axial movement of the mounting link against the action of the spring.

Other and further important objects and advantages will become apparent from the disclosures in the following specification and the accompanying drawings.

IN THE DRAWINGS

FIG. 1 is a front elevational view of a portion of a drum as used on a flail type mower and embodying the subject invention.

FIG. 2 is a detail sectional view taken on the line 2—2 of FIG. 1.

FIG. 3 is a front elevational view similar to that in FIG. 1 but showing the blades and the blade mounting link being removed from the mower drum.

FIG. 4 is still another front elevational view similar to that in FIGS. 1 and 3 but showing an optional device of locking the mounting link against removal from the mower drum.

FIG. 5 is a detail sectional view taken on the line 5—5 of FIG. 4.

AS SHOWN IN THE DRAWINGS

The reference numeral 10 indicates generally the drum of a flail type mower. Such drums are shown in my previous U.S. Pat. Nos. 3,693,335; 3,831,357; and 3,831,359. The drum 10 is adapted to carry on its cylindrical surface a plurality of sleeve lugs which in turn support flail type blades in desired patterns over the surface of the drum. One such sleeve lug 11 is shown in all of FIGS. 1, 2 and 3. The sleeve lug 11 is shaped in the form of a U having a first leg member 12, a spaced apart generally parallel leg member 13, and an arcuate or curved bottom 14 which smoothly joins the lower ends of the legs 12 and 13. The lug 11 provides a journal for blade supporting elements as will be subsequently described. The top of the leg 12 is welded at 15 to the cylindrical surface of the drum 10 and similarly the top of the leg 13 is welded at 16 to the surface of the drum 10. An axially aligned spaced apart sleeve lug 17, shown in FIGS. 1 and 3, is constructed identically to the lug 11.

A blade mounting link 18 of rod material has a first relatively long shank portion 19 and a second relatively shorter shank portion 20. The shank portions 19 and 20 are in axial alignment with each other. A depending loop 21 in the shape of a U is formed as a part of the blade mounting link between the inner ends of the aligned shank portions 19 and 20. A collar 22 is affixed to the inner end of the longer shank 19 at a position adjacent the depending loop 21. A coil spring 23 is mounted on and over the longer shank 19 and has its one end abutting the fixed collar 22 and its other end abutting the end of the sleeve lug 11 when the blade mounting link 18 is journally supported in the spaced apart sleeve lugs 11 and 17. The longer shank 19 is adapted to be journally received in the sleeve lug 11 as shown in FIGS. 1 and 3. Similarly the shorter shank 20 is adapted to be journally received in the spaced apart sleeve lug 17. As best shown in FIG. 1 the spring 23 abutting the fixed collar 22 causes an axial spring biasing of the blade mounting link 18 to cause it to be held in its journalled positions of the respective shanks 19 and 20. As the spring urges the collar 22 in a rightward direction as viewed in FIG. 1 it tends to attempt to pull the long shank 19 out of its journal engagement with the sleeve lug 11 and simultaneously acts to push the shorter axially aligned shank 20 into journal engagement with the sleeve lug 17. The overall length of the spaced shanks 19 and 20 is greater than the space between the spaced apart sleeve lugs 11 and 17. With this premise the long shank 19 is adapted to retain its journal engagement with the sleeve lug 11 when the spring 23 is fully extended as shown in FIG. 1. Conversely, when the blade mounting link 18 is moved axially in a leftward direction as viewed in FIG. 1 it causes the spring 23 to be compressed as shown in FIG. 3. The spring 23 being of a larger diameter than the rod shank 19 contacts the sleeve lug 11 to cause its compression. In this position where the spring is compressed the shorter shank 20 is moved free of its journal engagement with the sleeve lug 17 thus permitting an upward rocking of the longer shank 19 as shown in FIG. 3. At the point when the end of the shorter shank 20 is free of the sleeve lug 17 the entire knife mounting link 18 may be angled downwardly as shown in FIG. 3 after which it may be fully removed from its mounting by pulling the long shank 19 out of the sleeve lug 11. Although FIG. 3 of the drawing shows the blade mounting link 18 still in engagement with the sleeve lug 11 and a blade being removed from the link, it should be understood that the link 18 may be entirely removed from the mower drum 10 for replacement or servicing of the blades carried by this mounting link.

A blade 24 is adapted to be hung as a pendant from the U-shaped portion 21 of the blade supporting link 18. The pendant blade 24 has a generally vertical portion 25 and an outwardly flared or angled portion 26 adjoining that vertical portion. The outwardly angled portion is identified as the cutting element of the blade. A hole 27 is provided through the vertical portion and it is through this hole that the blade is mounted onto the blade supporting link 18. The hole 27 is of a diameter somewhat greater than the diameter of the blade mounting rod link 18 and thus the blade 24 loosely hangs and may easily move relative to the blade supporting link 18. A companion pendant blade 28 is similarly provided with a vertical portion 29 and an outwardly flared or angled cutting portion 30 in the same manner as for the construction of the blade 24. A hole 31 is provided through the vertical portion 29 near its upper end and the blade 28 is adapted to be mounted on the same blade carrying link 18 as for the blade 24. It is preferable that these blades have their outwardly flaring cutting portions 26 and 30 diverging as shown in FIG. 1.

In the operation of the flail mower the drum 10 is rotated at a speed to cause its blades, including blades 24 and 28 to be radially extended and to cut a crop as desired. In use the blades oftentimes strike foreign objects such as rocks or stones causing the blades 26 and 30 to become dull and thus cease cutting the crop or grasses efficiently. It is then necessary to sharpen or replace these dull blades. In the present invention blade removal is accomplished by an axial sliding of the blade supporting link 18 in a leftward direction as viewed in FIG. 1. This leftward movement is against the action of the spring 23 causing the spring 23 to compress as shown in FIG. 3 and causing the shorter shank 20 to be withdrawn entirely from its journal mounting in the sleeve lug 17. At this point the blade supporting link 18 may be rocked downwardly as shown in FIG. 3 to permit removal of the loosely mounted blades 24 and 28 from the blade supporting link 18. Or, the entire blade supporting link 18 may then be pulled out of its engagement with the sleeve lug 11 thereupon permitting servicing of the blades or the blade supporting link as desired. After the blades have been removed and serviced and then replaced either with resharpened blades or new blades the blade supporting link may be reengaged with the sleeve lugs 11 and 17 by going through steps just the reverse of the removal steps. The blade supporting link 18 is remounted by sliding the longer shank 19 into the slot between the spaced legs 12 and 13 of the sleeve lug 11 and continuing this insertion until the spring 23 is fully compressed whereupon the blade supporting link 18 is swung upwardly so that the shanks 19 and 20 are disposed horizontally. At this position the spring 23 is allowed to expand against the collar 22 and cause the shorter shank 20 to be reengaged for its journal carrying within the sleeve lug 17.

FIGS. 4 and 5 of the drawings show a modified form of the present invention wherein the blade supporting link may be optionally prevented from being removed. Where the parts are identical with those shown in FIGS. 1, 2 and 3 the same reference numerals have been used. Inasmuch as the sleeve lugs are slightly altered for this modification it has been deemed desirable to give those sleeve lugs different identifying numerals. A U-shaped sleeve lug 32 is comparable to the sleeve lug 11. The sleeve lug 32 is provided with spaced apart parallel legs 33 and 34. The leg 33 is welded at its upper end to the drum 10 at 35 and similarly the upper end of the leg 34 is welded at 36 to the drum 10. The lower ends of the legs are joined by an arcuate or curved bottom portion 37 which is similar to the curved bottom portion 14 of the lug 11. A hole 38 is provided through the leg 33 at a position between its upper and lower ends. An axially aligned hole 39 is provided through the leg 34 between its upper and lower ends. A bolt 40 is adapted to be passed through the aligned holes 38 and 39 thus locking the blade carrying link 18 in its journalled position within the spaced apart sleeve lugs by preventing the axial sliding of the rod link 18. The bolt 40 is provided with an enlarged head 41, a shank 42 and a removable nut 43 which is threadedly engaged to the shank 42. The bolt and nut assembly is inserted through the spaced holes 38 and 39 in the legs 33 and 34 respectively. When the bolt and nut assembly is mounted onto the sleeve lug 32 as shown in both of FIGS. 4 and 5 the shank 19 is prevented from being inserted further into the sleeve lug by reason of the blocking shank 42 of the bolt 40. Thus, when it is desired to remove the blade supporting link 18 it is first necessary to remove the nut 43 and pull the bolt from its engagement with the sleeve lug 32. Thereafter the blade supporting link 18 may be axially moved against the action of the coil spring 23 and the link removed as described for the showing in FIGS. 1, 2 and 3. The purpose of the bolt 40 is to prevent accidental removal of the blade supporting links by reason of their being subjected to strenuous vibrations and forces during mower operation. The blade supporting links 18 thus remain in operable position on the rotating drum 10 throughout all mower operations. An axially spaced apart sleeve lug 44 is comparable to the sleeve lug 17. The sleeve lug 44 is adapted to journally receive the short end 20 of the blade supporting link 18. The operation of the modified form of the invention as shown in FIGS. 4 and 5 is identical to the operation of the device of FIGS. 1, 2 and 3 with the exception that the locking bolt 40 must be removed prior to removal of the blades and its supporting link 18 or reengaged after mounting of new blades or serviced blades on the rotor assembly.

I am aware that numerous details of construction may be varied throughout a wide range without departing from the principles disclosed herein and I therefore do not propose limiting the patent granted hereon otherwise than as necessitated by the appended claims.

What is claimed is:

1. A releasable blade holder for a flail mower having a rotor drum comprising a first U-shaped sleeve lug welded to the surface of the rotor drum, a second U-shaped sleeve lug welded to the surface of the rotor drum in axial alignment with the first of said U-shaped sleeve lugs and with a certain spacing therebetween, a blade mounting link of rod material having a first long shank and a second short shank, said shanks in axial alignment and the overall length of the spaced apart shanks being greater than the certain space between the U-shaped sleeve lugs, said blade mounting link having a depending loop of U-shape between the spaced apart shanks, a blade having a portion with a hole therethrough, said blade hole being greater in size than the diameter of the link rod, said blade loosely received on said depending loop of the blade mounting link by passing the link rod through said blade hole, said long shank slidably received in one end of the first of said sleeve lugs, said short shank slidably received in the second of said sleeve lugs in the end thereof opposite the first sleeve lug, a collar fixed on said long shank at its inner end adjacent said depending loop, means restraining the removal of said blade mounting link from its engagement with the spaced apart U-shaped sleeve lugs, said means restraining including a coil spring mounted on said long shank having its one end abutting the fixed collar and its other end abutting the first of said sleeve lugs to normally urge said blade mounting link toward the second of said sleeve lugs, and upon compression of the coil spring by manually moving the blade mounting link toward greater engagement of the first of said sleeve lugs by the longer shank the shorter shank becomes disengaged from the second of said sleeve lugs permitting the blade mounting link to be rocked downwardly at that end causing the longer shank to swing up within the first of said U-shaped sleeve lugs for removal of the blade from the depending loop of the blade mounting link or full removal of the blade mounting link from the drum rotor by pulling the link out of the first U-shaped sleeve lug while it is in its rocked down position.

2. A device as set forth in claim 1 in which the means restraining the removal of the blade mounting link further includes a removable bolt passing through the first of said sleeve lugs at the location of the inner end of the long shank when the coil spring is extended to thereby prevent manual compression of the said coil spring.

* * * * *